Patented Oct. 18, 1949

2,485,017

UNITED STATES PATENT OFFICE 2,485,017

PRODUCTION OF ARYL DIHALOALKANES

Louis Schmerling, Riverside, Ill., assignor to Universal Oil Products Company, Chicago, Ill., a corporation of Delaware No Drawing. Application August 30, 1946, Serial No. 694,169

11 Claims. (Cl. 260—651)

This invention relates to a process for preparing an aryl dihaloalkane and more particularly to the preparing of a phenyl dihaloalkane containing a quaternary carbon atom.

An object of this invention is to prepare an aryl dihaloalkane in which the aryl group is joined to a carbon atom which is combined with three other carbon atoms.

Another object of this invention is to prepare an aryl dichloroalkane represented by the formula

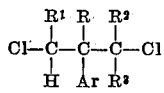

wherein Ar represents an aryl group, R represents an alkyl group, and each of $R^1$, $R^2$, and $R^3$ represents a member of the group consisting of a hydrogen atom and an alkyl group.

One specific embodiment of the present invention relates to a process for producing an aryl dichloroalkane which comprises reacting an aromatic hydrocarbon having a replaceable nuclear hydrogen atom and a dichloroolefin in which the double bond is located at a tertiary carbon atom in the presence of a catalyst comprising essentially a complex of a Friedel-Crafts halide with about an equal molecular proportion of an oxygen-containing organic compound selected from the group consisting of an alkanol, an alkyl ether, an alkyl ketone, and a nitroparaffin.

Another embodiment of this invention relates to a process for producing a phenyl dichloroalkane having a quaternary carbon atom which comprises reacting a benzene hydrocarbon having a replaceable nuclear hydrogen atom and a dichloroolefine in which the double bond is located at a tertiary carbon atom in the presence of a catalyst comprising essentially a complex of aluminum chloride and a nitroparaffin.

Dichloroolefins used in my process have a double bond located at a tertiary carbon atom and may be represented by the formula

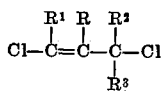

in which R represents an alkyl group, and each of $R^1$, $R^2$ and $R^3$ represents a member of the group consisting of a hydrogen atom and an alkyl group. The corresponding bromoolefins may also be used but of the two middle halogens, namely chlorine and bromine, I prefer the former because of the lower cost thereof.

Aromatic hydrocarbons which are reacted with dichloroolefins containing an unsaturated tertiary carbon atom as hereinbefore set forth comprise benzene, monoalkyl, and other alkylbenzenes having at least one replaceable nuclear hydrogen atom, naphthalene, alkyl naphthalene, and other polycyclic aromatic hydrocarbons having a replaceable hydrogen atom. Other aromatic compounds such as halobenzenes, phenols, etc., may also be used.

Catalysts employed in promoting the process of my invention comprise complexes of a Friedel-Crafts halide, particularly of aluminum chloride, aluminum bromide, ferric chloride, zirconium chloride, boron fluoride, and the like, with one molecular proportion of an oxygen-containing organic compound selected from the group consisting of an alkanol, an alkyl ether, an alkyl ketone, and a nitroparaffin.

The preferred catalysts are formed from a Friedel-Crafts halide and a nitroparaffin and include particularly composites or solutions of aluminum chloride in a nitroparaffin, such as nitromethane, nitroethane, nitropropane, and nitrobutane, or another mononitroalkane of higher molecular weight. The complexes of aluminum chloride and a nitroparaffin have an advantage over the other complexes which may be used as catalysts in the process in that they may be dissolved in an excess of the oxygen-containing compound, that is nitroparaffin, without loss of activity. The aluminum chloride-nitroparaffin complexes have the further advantage that they are soluble in the aromatic hydrocarbon and thus promote intimate contact of reactants and catalyst.

Another important advantage of my process is that aryl dihaloalkanes are produced in the presence of the complex catalysts of this invention but not in the presence of an unmodified Friedel-Crafts halide catalyst. These different results are illustrated in the following Equations 1 and 2:

(1) With complex catalyst:

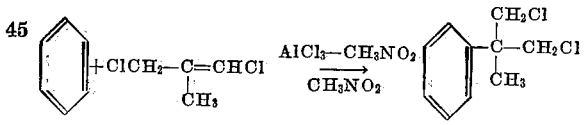

(2) With unmodified catalysts:

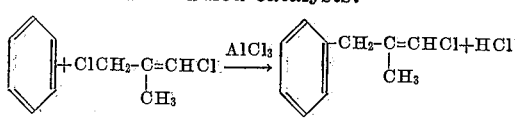

My process for producing an aryl dichloroalkane is carried out using either batch or continuous types of operation. In batch-type treatment, the reacting aromatic hydrocarbon and dichloroolefin are contacted in the presence of the catalyst complex for a time sufficient to cause the condensation of the two reactants and the formation of an aryl dichloroalkane. The desired aryl dichloroalkane is then recovered from the reaction product by suitable means.

Continuous condensation of an aromatic hydrocarbon and a dichloroolefin may be carried out by slowly introducing the dichloroolefin into a circulating commingled mixture of an aromatic hydrocarbon and a catalyst complex such as a complex of aluminum chloride with a nitroparaffin. The reaction mixture and catalyst contained therein are then passed through a mixer of suitable design to effect intimate contact between the catalyst and the mixture of aromatic hydrocarbon and chloroolefin charged thereto. The condensation reaction is carried out at a temperature of from about −20° to about 100° C. and at a pressure of from 1 to about 100 atmospheres. In the continuous type of operation it is generally advantageous to dilute the dichloroolefin with a portion of the aromatic hydrocarbon and to introduce the resultant mixture into the reaction zone at a plurality of points between its entrance and exit rather than to mix all of the dichloroolefin with the aromatic hydrocarbon or aromatic hydrocarbon fraction prior to introduction to the reaction zone. The desired aryl dichloroalkane is recovered from the reaction product by suitable means.

The following example is given to illustrate the character of the results obtained by the use of the present process although the data presented should not be construed to limit unduly the generally broad scope of the invention.

A clear yellow solution resulting from the addition of a solution of 5 grams of anhydrous aluminum chloride in 6 grams of nitromethane to 80 grams of benzene was stirred in a flask maintained at a temperature of 0° C. A solution of 55 grams of 1,3-dichloro-2-methyl-1-propene in 80 grams of benzene was added with stirring during one hour and the stirring was continued for an additional hour, after which the product was washed with water, dried, and distilled. In addition to unreacted benzene and 1,3-dichloro-2-methyl-1-propene, there was also obtained 45 grams of a dichlorobutylbenzene (51% of the theoretical) boiling at 103° C. and a pressure of 4 mm. of mercury and having a refractive index, $n_D^{20}$, of 1.5350. Analysis of this dichlorobutylbenzene showed 59.18% carbon; 5.90% hydrogen; and 34.78% of chlorine. This analysis corresponds with that calculated for the formula: $C_{10}H_{12}Cl_2$, namely, carbon, 59.11%; hydrogen 5.96%; and chlorine, 34.93%. This chloride was 1,3 - dichloro-2 - methyl - 2 - phenylpropane which is a new composition of matter.

Another run in which 1,3-dichloro-3-methyl-1-propene was condensed with benzene under the same conditions but in the presence of 5 g. of aluminum chloride (no oxygen-containing organic compound being present) yielded 17 g. of chlorobutenylbenzene (23% of the theoretical) together with lesser amounts of diphenylbutene and diphenylbutane and 25 g. of high-boiling tarry residue, but not the unexpected product of the present invention, namely, 1,3-dichloro-2-methyl-2-phenylpropane. The chlorobutenylbenzene was 1-chloro-2-methyl-3-phenyl-1-propene, a new composition of matter. Analysis: Calculated for $C_{10}H_{11}Cl$: carbon, 72.05%; hydrogen, 6.66%; chlorine, 21.2%. Found: carbon, 71.55%; hydrogen, 6.82%; chlorine, 21.6%.

The novelty and utility of the process of this invention are evident from the preceding specification and the data presented although neither section is introduced to limit unduly the generally broad scope.

I claim as my invention:

1. A process for producing an aromatic dihaloalkane which comprises reacting an aromatic compound having a replaceable nuclear hydrogen atom and a dihaloolefin containing a middle halogen and in which the double bond is located at a tertiary carbon atom in the presence of a catalyst comprising essentially a complex of a Friedel-Crafts halide and about an equal molecular proportion of an oxygen-containing organic compound selected from the group consisting of an alkanol, an alkyl ether, an alkyl ketone, and a nitroparaffin.

2. A process for producing an aromatic dichloroalkane which comprises reacting an aromatic compound having a replaceable nuclear hydrogen atom and a dichloroolefin in which the double bond is located at a tertiary carbon atom in the presence of a catalyst comprising essentially a complex of a Friedel-Crafts halide and about an equal molecular proportion of an oxygen-containing organic compound selected from the group consisting of an alkanol, an alkyl ether, an alkyl ketone, and a nitroparaffin.

3. A process for producing an aryl dichloroalkane which comprises reacting an aromatic hydrocarbon having a replaceable nuclear hydrogen atom and a dichloroolefin in which the double bond is located at a tertiary carbon atom in the presence of a catalyst comprising essentially a complex of a Friedel-Crafts halide and about an equal molecular proportion of an oxygen-containing organic compound selected from the group consisting of an alkanol, an alkyl ether, an alkyl ketone, and a nitroparaffin.

4. A process for producing a phenyl dichloroalkane which comprises reacting a benzene hydrocarbon having a replaceable nuclear hydrogen atom and a dichloroolefin in which the double bond is located at a tertiary carbon atom in the presence of a catalyst comprising essentially a complex of a Friedel-Crafts halide and about an equal molecular proportion of an oxygen-containing organic compound selected from the group consisting of an alkanol, an alkyl ether, an alkyl ketone, and a nitroparaffin.

5. A process for producing a phenyl dichloroalkane having a quaternary carbon atom which comprises reacting a benzene hydrocarbon having a replaceable nuclear hydrogen atom with a dichloroolefin in which the double bond is located at a tertiary carbon atom in the presence of a catalyst comprising essentially a complex of aluminum chloride and a nitroparaffin.

6. A process for producing a phenyl dichloroalkane having a quaternary carbon atom which comprises reacting a benzene hydrocarbon having a replaceable nuclear hydrogen atom with a dichloroolefin in which the double bond is located at a tertiary carbon atom at a temperature of from about −20° to about 100° C. in the presence of a catalyst comprising essentially a complex of aluminum chloride and a nitroparaffin.

7. A process for preparing a 1,3-dichloro-2-methyl-2-arylpropane which comprises reacting an aromatic hydrocarbon having a replaceable nuclear hydrogen atom and 1,3-dichloro-2-methyl-1-propene in the presence of a catalyst comprising essentially a complex of a Friedel-Crafts halide and about an equal molecular proportion of an oxygen-containing organic compound selected from the group consisting of an alkanol, an alkyl ether, an alkyl ketone, and a nitroparaffin.

8. A process for preparing 1,3-dichloro-2-methyl-2-phenylpropane which comprises reacting benzene and 1,3-dichloro-2-methyl-1-propene in the presence of a catalyst comprising essentially a complex of a Friedel-Crafts halide and about an equal molecular proportion of an oxygen-containing organic compound selected from the group consisting of an alkanol, an alkyl ether, an alkyl ketone, and a nitroparaffin.

9. A process for preparing 1,3-dichloro-2-methyl-2-phenylpropane which comprises reacting benzene and 1,3-dichloro-2-methyl-1-propene in the presence of a catalyst comprising essentially a complex of aluminum chloride and a nitroparaffin.

10. A process for preparing 1,3-dichloro-2-methyl-2-phenylpropane which comprises reacting benzene and 1,3-dichloro-2-methyl-1-propene at a temperature of from about —20° to about 100° C. in the presence of a catalyst comprising essentially a complex of aluminum chloride and a nitroparaffin.

11. A process for preparing 1,3-dichloro-2-methyl-2-phenylpropane which comprises reacting benzene and 1,3-dichloro-2-methyl-1-propene at a temperature of about 0° C. in the presence of a solution of aluminum chloride in nitromethane.

LOUIS SCHMERLING.

REFERENCES CITED

The following references are of record in the file of this patent:

FOREIGN PATENTS

| Number | Country | Date |
|--------|---------|------|
| 448,851 | Great Britain | June 10, 1936 |

OTHER REFERENCES

Thomas: "Anhydrous Aluminum Chloride in Organic Chemistry," pages 121–2 (1941).